United States Patent
Bomal et al.

(12)

(10) Patent No.: US 6,702,888 B2
(45) Date of Patent: *Mar. 9, 2004

(54) PROCESS FOR THE PREPARATION OF PRECIPITATED SILICA, NEW PRECIPITATED SILICAS CONTAINING ALUMINUM AND THEIR USE FOR THE REINFORCEMENT OF ELASTOMERS

(75) Inventors: Yves Bomal, Paris (FR); Yvonick Chevallier, Fontaines-Saint-Martin (FR); Philippe Cochet, Lyons (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/183,097

(22) Filed: Jun. 26, 2002

(65) Prior Publication Data

US 2003/0066459 A1 Apr. 10, 2003

Related U.S. Application Data

(60) Continuation of application No. 09/671,469, filed on Sep. 27, 2000, now abandoned, which is a continuation of application No. 09/104,238, filed on Jun. 12, 1998, now abandoned, which is a division of application No. 08/737,882, filed as application No. PCT/FR96/00464 on Mar. 28, 1996, now Pat. No. 5,800,608.

(30) Foreign Application Priority Data

Mar. 29, 1995 (FR) ............................................ 95 03674

(51) Int. Cl.$^7$ .................. C01B 33/193; C09C 1/30; C08K 3/36; C08L 21/00

(52) U.S. Cl. ...................... 106/492; 106/483; 423/335; 423/339; 524/492; 524/493; 524/494

(58) Field of Search ................................ 106/483, 492; 423/335, 339; 524/492, 493, 494

(56) References Cited

U.S. PATENT DOCUMENTS

| | | | |
|---|---|---|---|
| 4,040,858 A | 8/1977 | Wason | 423/339 |
| 4,157,920 A | 6/1979 | Wason et al. | 423/339 |
| 5,234,493 A | 8/1993 | Dromard et al. | 106/483 |
| 5,403,570 A | 4/1995 | Chevallier et al. | 423/339 |
| 5,587,416 A | 12/1996 | Chevallier et al. | 524/492 |
| 5,852,099 A | 12/1998 | Vanel | 524/492 |
| 6,221,149 B1 | 4/2001 | Bomal et al. | 106/492 |

FOREIGN PATENT DOCUMENTS

WO  WO 95/09128  4/1995  ......... C01B/33/193

Primary Examiner—Michael Marcheschi

(57) ABSTRACT

The invention relates to a new process for the preparation of precipitated silica which has an excellent dispersibility and very satisfactory reinforcing properties. It also relates to new precipitated silicas which are in the form of powder, of substantially spherical beads or of granules, these silicas being characterized by the fact that they have a CTAB specific surface of between 140 and 200 $m^2/g$, a BET specific surface of between 140 and 200 $m^2/g$, a DOP oil uptake lower than 300 ml/100 g, a median diameter, after disintegration with ultrasound, smaller than 3 $\mu$m, an ultrasonic disintegration factor higher than 10 ml and an aluminum content of at least 0.35% by weight. The invention also relates to the use of the said silicas as reinforcing fillers for elastomers.

8 Claims, No Drawings

PROCESS FOR THE PREPARATION OF PRECIPITATED SILICA, NEW PRECIPITATED SILICAS CONTAINING ALUMINUM AND THEIR USE FOR THE REINFORCEMENT OF ELASTOMERS

This application is a continuation of U.S. application Ser. No. 09/671,469, filed on Sep. 27, 2000, now abandoned which is a continuation Application of U.S. application Ser. No. 09/104,238, filed on Jun. 12, 1998 now abandoned which is a Divisional Application of U.S. application Ser. No. 08/737,882 filed Mar. 3, 1997 U.S. Pat. No. 5,800,608 which is a 371 of PCT/FR96/00464 filed Mar. 28, 1996.

The present invention relates to a new process for the preparation of precipitated silica, to precipitated silicas which are in particular in the form of powder, of substantially spherical beads or of granules, and to their application as a reinforcing filler for elastomers.

It is known that precipitated silica has been employed for a long time as a white reinforcing filler in elastomers.

However, like any reinforcing filler, it is appropriate that it should be capable of, on the one hand, being handled and above all, on the other hand, of being easily incorporated into the mixtures.

It is known in general that, to obtain the optimum reinforcing properties conferred by a filler, it is appropriate that the latter should be present in the elastomer matrix in a final form which is both as finely divided as possible and distributed as homogeneously as possible. However, such conditions can be achieved only insofar as, on the one hand, the filler has a very good ability to be incorporated into the matrix during mixing with the elastomer (incorporability of the filler) and to disintegrate or to deagglomerate into the form of a very fine powder (disintegration of the filler) and as, on the other hand, the powder resulting from the abovementioned disintegration process can itself, in its turn, be perfectly and homogeneously dispersed in the elastomer (dispersion of the powder).

Moreover, for reasons of mutual affinities, silica particles have an unfortunate tendency, in the elastomer matrix, to agglomerate with each other. These silica/silica interactions have a detrimental consequence of limiting the reinforcing properties to a level that is substantially lower than that which it would be theoretically possible to expect if all the silica/elastomer interactions capable of being created during the mixing operation were actually obtained (this theoretical number of silica/elastomer interactions being, as is well known, directly proportional to the external surface of the silica employed).

Furthermore, in the raw state, such silica/silica interactions tend to increase the stiffness and the consistency of the mixtures, thus making them more difficult to process.

The problem arises of having available fillers which, while being capable of being relatively large in size, have a very good dispersibility in elastomers.

The aim of the present invention is to overcome the abovementioned disadvantages and to solve the abovementioned problem.

More precisely, its aim is especially to propose a new process for the preparation of precipitated silica which, advantageously, has a very good dispersibility (and disintegratability) and very satisfactory reinforcing properties, in particular which, when employed as a reinforcing filler for elastomers, imparts excellent rheological properties to the latter while providing them with good mechanical properties.

The invention also relates to precipitated silicas which, preferably, are in the form of powder, of substantially spherical beads or, optionally, of granules, and which, while being of relatively large size, have an excellent dispersibility (and disintegratability) and very satisfactory reinforcing properties.

It relates, finally, to the use of the said precipitated silicas as reinforcing fillers for elastomers.

In the description which follows, the BET specific surface is determined according to the Brunauer-Emmet-Teller method described in the Journal of the American Chemical Society, Vol. 60, page 309, February 1938 and corresponding to NFT standard 45007 (November 1987).

The CTAB specific surface is the outer surface determined according to NFT standard 45007 (November 1987) (5.12).

The DOP oil uptake is determined according to NFT standard 30-022 (March 1953) by using dioctyl phthalate.

The packing density (PD) is measured according to NFT standard 030100.

The pH is measured according to ISO standard 787/9 (pH of a suspension at a concentration of 5% in water).

Finally, it is specified that the given pore volumes are measured by mercury porosimetry, the pore diameters being calculated from the Washburn relationship with an angle of contact theta equal to 130° and a surface tension gamma equal to 484 dynes/cm (MICROMETRICS 9300® porosimeter).

The dispersibility and the disintegratability of the silica according to the invention can be quantified by means of a specific disintegration test.

The disintegration test is carried out according to the following procedure:

the cohesion of the agglomerates is assessed by a particle size measurement (using laser scattering), performed on a silica suspension previously disintegrated by ultrasonic treatment; the disintegratability of the silica is thus measured (rupture of objects from 0.1 to a few tens of microns). The disintegration under ultrasound is performed with the aid of a VIBRACELL BIOBLOCK (600 W)® sonic transducer equipped with a probe 19 mm in diameter. The particle size measurement is performed by laser scattering on a Sympatec particle size analyser.

2 grams of silica are measured out into a specimen tube (height: 6 cm and diameter: 4 cm) and are made up to 50 grams by adding demineralized water; an aqueous suspension containing 4% of silica is thus produced, which is homogenized for 2 minutes by magnetic stirring. The disintegration under ultrasound is next performed as follows: with the probe immersed to a depth of 4 cm, the power is adjusted so as to obtain a needle deflection on the power dial indicating 20% (which corresponds to an energy of 120 watts/cm$^2$ dissipated by the end of the probe). The disintegration is performed for 420 seconds. The particle size measurement is then carried out after a known volume (expressed in ml) of the homogenized suspension has been introduced into the cell of the particle size analyser.

The value of the median diameter $\emptyset_{50}$ which is obtained is proportionally smaller the higher the disintegratability of the silica. The ratio (10× volume of dispersion introduced (in ml))/optical density of the suspension detected by the particle size analyser (this optical density is of the order of 20) is also determined. This ratio is an indication of the proportion of fines, that is to say of the content of particles smaller than 0.1 μm, which are not detected by the particle size analyser. This ratio, called the ultrasonic disintegration factor ($F_D$) is proportionally higher the higher the disintegratability of the silica.

One of the subjects of the invention is a process for the preparation of precipitated silica of the type including the reaction of a silicate with an acidifying agent, whereby a suspension of precipitated silica is obtained, followed by the separation and the drying of this suspension, in which the precipitation is carried out in the following manner:

(i) an initial base stock comprising a silicate and an electrolyte is formed, the silicate concentration (expressed as $SiO_2$) in the said initial base stock being lower than 100 g/l and the electrolyte concentration in the said initial base stock being lower than 17 g/l, (ii) the acidifying agent is added to the said base stock until a pH value of the reaction mixture of at least approximately 7 is obtained, (iii) acidifying agent and a silicate are added simultaneously to the reaction mixture, and in which a suspension which has a solids content of not more than 24% by weight is dried, characterized in that the said process includes one of the following two operations (a) or (b):

(a) at least one aluminum compound A and then a basic agent are added to the reaction mixture after stage (iii), the said separation comprising a filtration and a disintegration of the cake originating from this filtration, the said disintegration being performed in the presence of at least one aluminum compound B, (b) a silicate and at least one aluminum compound A are added simultaneously to the reaction mixture after stage (iii) and, when the said separation comprises a filtration and a disintegration of the cake originating from this filtration, the disintegration is preferably performed in the presence of at least one aluminum compound B.

It has thus been found that the introduction of aluminum—this being according to a particular method—combined with a low silicate concentration (expressed as $SiO_2$) and of electrolyte in the initial base stock and at an appropriate solids content of the suspension to be dried constitutes an important condition for imparting their good properties to the products obtained, especially a remarkable dispersibility and very satisfactory reinforcing properties.

It should be noted, in general, that the process concerned is a process for the synthesis of precipitated silica, that is to say that an acidifying agent is reacted with a silicate in very special conditions.

The choice of the acidifying agent and of the silicate is made in a manner which is well known per se.

It may be recalled that the acidifying agent generally employed is a strong inorganic acid such as sulphuric acid, nitric acid or hydrochloric acid, or an organic acid such as acetic acid, formic acid or carbonic acid.

The acidifying agent may be dilute or concentrated; its normality may be between 0.4 and 36 N, for example between 0.6 and 1.5 N.

In particular, in the case where the acidifying agent is sulphuric acid, its concentration may be between 40 and 180 g/l, for example between 60 and 130 g/l.

It is possible, furthermore, to employ as a silicate any common form of silicates such as metasilicates, disilicates and advantageously an alkali metal silicate, especially sodium or potassium silicate.

The silicate may exhibit a concentration, expressed as silica, of between 40 and 330 g/l, for example between 60 and 300 g/l, in particular between 60 and 250 g/l.

In general, sulphuric acid is employed as the acidifying agent, and sodium silicate as the silicate.

In the case where sodium silicate is employed, the latter generally exhibits an $SiO_2/Na_2O$ weight ratio of between 2 and 4, for example between 3.0 and 3.7.

Insofar as the process of preparation of the invention is more particularly concerned, the precipitation is done in a specific manner according to the following stages.

First of all a base stock is formed which includes some silicate and an electrolyte (stage (i)). The quantity of silicate present in the initial base stock advantageously represents only a part of the total quantity of silicate introduced into the reaction.

The term electrolyte is understood here in its normal accepted meaning, that is to say that it denotes any ionic or molecular substance which, when in solution, decomposes or dissociates to form ions or charged particles. An electrolyte which may be mentioned is a salt from the group of the alkali and alkaline-earth metal salts, especially the salt of the metal of the starting silicate and of the acidifying agent, for example sodium sulphate in the case of the reaction of a sodium silicate with sulphuric acid.

According to one characteristic of the process of preparation according to the invention the concentration of electrolyte in the initial base stock is (higher than 0 g/l and) lower than 17 g/l, preferably lower than 14 g/l.

According to another characteristic of the process of preparation according to the invention, the silicate concentrate in the initial base stock is (higher than 0 g/l and) lower than 100 g of $SiO_2$ per liter. This concentration is preferably lower than 90 g/l, especially lower than 85 g/l. In some cases it may be lower than 80 g/l.

The second stage consists in adding the acidifying agent to the base stock of composition described above (stage (ii)).

This addition, which entails a corresponding lowering in the pH of the reaction mixture, takes place until a pH value of at least approximately 7, generally between 7 and 8, is reached.

Once the desired pH value is reached, a simultaneous addition (stage (iii)) of acidifying agent and of silicate is then carried out.

This simultaneous addition is preferably carried out so that the pH value is continuously equal (to within +/−0.1) to that reached at the end of stage (ii).

According to an essential characteristic of the process of preparation according to the invention, the latter includes one of the two operations, (a) or (b) mentioned above, that is to say:

(a) at least one aluminum compound A and then a basic agent are added, after stage (iii) to the reaction mixture, the separation used in the process comprising a filtration and a disintegration of the cake originating from this filtration, the said disintegration being performed in the presence of at least one aluminum compound B, or (b) a silicate and at least one aluminum compound A are added simultaneously, after stage (iii) to the reaction mixture and, when the separation used in the process comprises a filtration and a disintegration of the cake originating from this filtration, the disintegration is preferably performed in the presence of at least one aluminum compound B.

In a first alternative form of the process of preparation according to the invention (that is to say when the latter includes the operation (a)), the following successive stages are performed advantageously after having carried out the precipitation according to the stages (i), (ii) and (iii) described above:

(iv) at least one aluminum compound A is added to the reaction mixture (that is to say to the reaction suspension or slurry obtained), (v) a basic agent is added to the reaction mixture preferably until a pH value of the reaction mixture of between 6.5 and 10, in particular between 7.2 and 8.6, is obtained, (vi) acidifying agent is added to the reaction mixture, preferably until a pH value of the reaction mixture of between 3 and 5, in particular between 3.4 and 4.5, is obtained.

After the simultaneous addition of stage (iii) it may then be advantageous to perform a maturing of the reaction mixture, it being possible for this maturing to last, for example, from 1 to 60 minutes, in particular from 3 to 30 minutes.

In this first alternative form it is desirable, between stage (iii) and stage (iv), and especially before the said optional maturing, to add an additional quantity of acidifying agent to the reaction mixture. This addition is generally done until a pH value of the reaction mixture of between 3 and 6.5, in particular between 4 and 6, is obtained.

The acidifying agent employed during this addition is generally identical with that employed during stages (ii), (iii) and (vi) of the first alternative form of the process of preparation according to the invention.

A maturing of the reaction mixture is usually performed between stage (v) and (vi), for example for 2 to 60 minutes, in particular for 5 to 45 minutes.

Similarly, a maturing of the reaction mixture is in most cases performed after stage (vi), for example for 2 to 60 minutes, in particular for 5 to 30 minutes.

The basic agent employed during stage (iv) may be a solution of aqueous ammonia or, preferably, a solution of sodium hydroxide (or soda).

In a second alternative form of the process of preparation according to the invention (that is to say when the latter includes the operation (b)), a stage (iv) is performed after the stages (i), (ii) and (iii) described previously, which consists in adding a silicate and at least one aluminum compound A simultaneously to the reaction mixture.

After the simultaneous addition of stage (iv) it may then be advantageous to perform a maturing of the reaction mixture, it being possible for this maturing to last, for example, from 2 to 60 minutes, in particular from 5 to 30 minutes.

In this second alternative form it is desirable, after stage (iv), and especially after this optional maturing, to add an additional quantity of acidifying agent to the reaction mixture. This addition is generally done until a pH value of the reaction mixture of between 3 and 6.5, in particular between 4 and 6, is obtained.

The acidifying agent employed during this addition is generally identical with that employed during stages (ii) and (iii) of the second alternative form of the process of preparation according to the invention.

A maturing of the reaction mixture is usually performed after this addition of acidifying agent, for example for 1 to 60 minutes, in particular for 3 to 30 minutes.

The aluminum compound A employed in the process of preparation according to the invention is generally an organic or inorganic aluminum salt.

By way of examples of an organic salt there may be mentioned especially the salts of carboxylic or polycarboxylic acids, like the salts of acetic, citric, tartaric or oxalic acid.

By way of examples of an inorganic salt there may be mentioned especially halides and oxyhalides (like chlorides and oxychlorides), nitrates, phosphates, sulphates and oxysulphates.

In practice, the aluminum compound A may be employed in the form of a solution, generally aqueous.

An aluminum sulphate is preferably employed as aluminum compound A.

The temperature of the reaction mixture is generally between 70 and 98° C.

According to an alternative form of the invention the reaction is performed at a constant temperature of between 75 and 96° C.

According to another (preferred) alternative form of the invention the temperature at the end of the reaction is higher than the temperature at the beginning of reaction; the temperature at the beginning of the reaction is thus maintained preferably between 70 and 96° C. and the temperature is then raised over a few minutes, preferably up to a value of between 80 and 98° C., which value it is maintained until the end of the reaction; the operations (a) or (b) are thus usually performed at this constant temperature value.

At the outcome of the stages which have just been described a silica slurry is obtained which is then separated (liquid-solid separation).

In the first alternative form of the process of the preparation according to the invention (that is to say when the latter includes the operation (a)), this separation comprises a filtration (followed by washing if necessary) and a disintegration, the said disintegration being performed in the presence of at least one aluminum compound B and, preferably, in the presence of an acidifying agent as described above (in this latter case the aluminum compound B and the acidifying agent are advantageously added simultaneously).

The disintegration operation, which may be carried out, for example, by passing the filter cake through a mill of the colloid or bead type, makes it possible in particular to lower the viscosity of the suspension to be subsequently dried.

In the second alternative form of the process of preparation according to the invention (that is to say when the latter includes the operation (b)), the separation also comprises, in general, a filtration (followed by washing if necessary) and a disintegration, the said disintegration being preferably performed in the presence of at least one aluminum compound B and, in general, in the presence of an acidifying agent as described above (in this latter case the aluminum compound B and the acidifying agent are advantageously added simultaneously).

The aluminum compound B is usually different from the aluminum compound A mentioned above and generally consists of an alkali metal, especially potassium, or, very preferably, sodium, aluminate.

The quantities of the aluminum compounds A and B employed in the process of preparation according to the invention are preferably such that the precipitated silica prepared contains at least 0.35%, in particular at least 0.45%, for example between 0.50 and 1.50%, or even between 0.75 and 1.40%, by weight of aluminum.

The separation used in the process of preparation according to the invention usually includes a filtration performed by means of any suitable method, for example by means of a belt filter, a rotary vacuum filter or, preferably, a filter press.

The suspension of precipitated silica thus recovered (filter cake) is then dried.

According to one characteristic of the process of preparation according to the invention, this suspension must exhibit, immediately before its drying, a solids content of not more than 24% by weight, preferably not more than 22% by weight.

This drying may be done according to any method that is known per se.

The drying is preferably done by spraying.

Any suitable type of sprayer may be employed for this purpose, especially a turbine, nozzle, liquid-pressure or two-fluid sprayer.

According to one embodiment of the invention, the suspension to be dried has a solids content higher than 15% by weight, preferably higher than 17% by weight and, for example, higher than 20% by weight. The drying is then preferably performed by means of a nozzle sprayer.

The precipitated silica capable of being obtained according to this embodiment of the invention and preferably by using a filter press is advantageously in the form of substantially spherical beads, preferably of a mean size of at least 80 µm.

It should be noted that dry material for example silica in pulverulent form may be also added to the filter cake after the filtration, at a subsequent stage of the process.

At the end of the drying, a stage of milling may be undertaken on the product recovered, especially on the product obtained by drying a suspension which has a solids content higher than 15% by weight. The precipitated silica which is then obtainable is generally in the form of a powder, preferably with a mean size of at least 15 µm, in particular between 15 and 60 µm, for example between 20 and 45 µm.

The milled products with the desired particle size can be separated from any nonconforming products by means, for example, of vibrating screens which have appropriate mesh sizes, and the nonconforming products thus recovered can be returned to the milling.

Similarly, according to another embodiment of the invention, the suspension to be dried has a solids content of at most 15% by weight. The drying is then generally performed by means of a turbine sprayer. The precipitated silica which is then obtainable according to this embodiment of the invention and preferably by using a rotary vacuum filter is generally in the form of a powder, preferably with a mean size of at least 15 µm, in particular between 30 and 150 µm, for example between 45 and 120 µm.

Finally, the product which has been dried (especially from a suspension which has a solids content of at most 15% by weight) or milled can, according to another embodiment of the invention, be subjected to an agglomeration stage.

Agglomeration is here intended to mean any process which enables finely divided objects to be bonded together in order to bring them into the form of objects of larger size and which are mechanically stronger.

These processes are especially direct compression, wet-route granulation (that is to say with the use of a binder such as water, silica slurry, etc.), extrusion and, preferably, dry compacting.

When this last technique is used it may be found advantageous, before starting the compacting, to deaerate the pulverulent products (an operation which is also called predensifying or degassing), so as to remove the air included therein and to ensure a more uniform compacting.

The precipitated silica which can be obtained according to this embodiment of the invention is advantageously in the form of granules, preferably at least 1 mm in size, in particular between 1 and 10 mm.

At the end of the agglomeration stage the products may be classified to a desired size, for example by screening, and then packaged for their future use.

The powders, as well as the beads, of precipitated silica which are obtained by the process according to the invention thus offer the advantage, among others, of providing access to granules such as those motioned above, in a simple, efficient and economical manner, especially by conventional forming operations, such as, for example, granulation or compacting, without the latter resulting in degradation capable of masking, or even annihilating, the good intrinsic properties associated with these powders or these beads, as may be the case in the prior art when using conventional powders.

Other subjects of the invention consist of new precipitated silicas which have an excellent dispersibility (and disintegratability) and very satisfactory reinforcing properties, in particular which, when employed as a reinforcing filler for elastomers, impart excellent Theological properties to the latter while providing them with good mechanical properties.

Thus, a new precipitated silica is now proposed, according to the invention, characterized in that it has:

a CTAB specific surface of between 140 and 200 m$^2$/g, preferably between 145 and 180 m$^2$/g, a BET specific surface of between 140 and 200 m$^2$/g, preferably between 150 and 190 m$^2$/g, a DOP oil uptake lower than 300 ml/100 g, preferably between 200 and 295 ml/100 g, a median diameter ($\emptyset_{50}$), after disintegration with ultrasound, smaller than 3 µm, preferably smaller than 2.8 µm, for example smaller than 2.5 µm, an ultrasonic disintegration factor ($F_D$) higher than 10 ml, preferably higher than 11 ml, an aluminum content of at least 0.35% by weight, preferably at least 0.45% by weight.

The disintegration factor of the silica according to the invention is advantageously at least 15 ml; it may be, for example, at least 21 ml.

The silica according to the invention preferably has an aluminum content of between 0.50 and 1.50% by weight; this content may be especially between 0.75 and 1.40% by weight.

According to a particular embodiment of the invention, one of the characteristics of the silica may also lie in the distribution, or spread, of the pore volume and especially in the distribution of the pore volume which is produced by the pores of diameters smaller than or equal to 400 Å. This latter volume corresponds to the useful pore volume of the fillers which are employed in the reinforcement of elastomers. Analysis of the programs shows that the silica according to a particular method of the invention then has a pore distribution such that the pore volume consisting of the pores whose diameter is between 175 and 275 Å represents at least 50%, for example at least 60%, of the pore volume consisting of the pores of diameters smaller than or equal to 400 Å.

According to a very preferred alternative form of the invention the silica has a BET specific surface/CTAB specific surface ratio of between 1.0 and 1.2, that is to say that it preferably has a very low microporosity.

The pH of the silica according to the invention is generally between 6.5 and 7.5, for example between 6.7 and 7.3.

The silicas according to the invention may be in the form of powders, of substantially spherical beads or, optionally, of granules, and are characterized particularly by the fact that, while being relatively large in size, they have an excellent dispersibility and disintegratability and very satisfactory reinforcing properties. They thus exhibit a dispersibility and disintegratability that are advantageously superior to that of the silicas of the prior art, which are identical or closely related in specific surface and identical or closely related in size.

The silica powders according to the invention preferably have a mean size of at least 15 µm; the latter is, for example, between 15 and 60 μm (especially between 20 and 45 μm) or between 30 and 150 μm (especially between 45 and 120 μm).

They have, preferably, a DOP oil uptake of between 240 and 290 ml/100 g.

The packing density (PD) of the said powders is generally at least 0.17 and, for example, between 0.2 and 0.3.

The said powders generally have a total pore volume of at least 2.5 cm$^3$/g and, more particularly, of between 3 and 5 cm$^3$/g.

They make it possible in particular to obtain a very good compromise between processing and mechanical properties in the vulcanized state.

They also constitute preferred precursors for the synthesis of granulates as described later.

The substantially spherical beads according to the invention preferably have a mean size of at least 80 μm.

According to certain alternative forms of the invention, this mean bead size is at least 100 μm, for example at least 150 μm; it is generally at most 300 μm and preferably lies between 100 and 270 m. This mean size is determined according to NF standard X 11507 (December 1970) by dry screening and determination of the diameter corresponding to a cumulative oversize of 50%.

They preferably have a DOP oil uptake of between 240 and 290 ml/100 g.

The packing density (PD) of the said beads (or pearls) is generally at least 0.17 and, for example, between 0.2 and 0.34.

They usually have a total pore volume of at least 2.5 cm$^3$/g and, more particularly, of between 3 and 5 cm$^3$/g.

As indicated above, such a silica in the form of substantially spherical beads which are advantageously solid, homogeneous and low in dust and have good pourability, has an excellent disintegratability and dispersibility. In addition, it exhibits good reinforcing properties. Such a silica also constitutes a preferred precursor for the synthesis of the powders and granules according to the invention.

Such a silica in the form of substantially spherical beads constitutes a highly advantageous alternative form of the invention.

The dimensions of the granules according to the invention are preferably at least 1 mm, in particular between 1 and 10 mm, along the axis of their largest dimension (length).

They preferably have a DOP oil uptake of between 200 and 260 ml/100 g.

The said granules may be of the most diverse shape. The shapes which may be especially mentioned by way of example are the spherical, cylindrical, parallelepipedal, tablet, flake, pellet and extrudate of circular or polylobar section.

The packing density (PD) of the said granules is generally at least 0.27 and may range up to 0.37.

They generally have a total pore volume of at least 1 cm$^3$/g and, more particularly, between 1.5 and 2 cm$^3$/g.

The silicas according to the invention, especially in the form of powder or of substantially spherical beads or granules are preferably prepared according to one of the appropriate alternative forms of the process of preparation in accordance with the invention and described above.

The silicas according to the invention or prepared by the process according to the invention find a particularly advantageous application in the reinforcement of natural or synthetic elastomers. They impart excellent rheological properties to these elastomers while providing them with good mechanical properties and, in general, good resistance to abrasion. In addition, these elastomers are preferably less liable to heating.

The following examples illustrate the invention without, however, limiting its scope.

EXAMPLE 1 (COMPARATIVE)

The following are introduced into a stainless steel reactor provided with a stirring system using propellers and with heating using a jacket:

350 liters of water 7.5 kg of $Na_2SO_4$ 580 liters of aqueous sodium silicate which has an $SiO_2$/$Na_2O$ weight ratio equal to 3.45 and a relative density at 20° C. equal to 1.133.

The silicate concentration, expressed as $SiO_2$, in the initial base stock is then 84 g/l. The mixture is then heated to a temperature of 82° C. while being kept stirred. 395 liters of dilute sulphuric acid with a relative density at 20° C. of 1.050 are then introduced until a pH value of 7.5 (measured at its temperature) is obtained in the reaction mixture. The reaction temperature is 82° C. for the first 25 minutes; it is then raised from 82 to 94° C. in approximately 15 minutes and then held at 94° C. until the end of the reaction.

75 liters of aqueous sodium silicate of the type described above and 121 liters of sulphuric acid, also of the type described above, are next introduced jointly into the reaction mixture, this simultaneous introduction of acid and of silicate being carried out so that the pH of the reaction mixture during the introduction period is continuously equal to 7.5±0.1. After all the silicate has been introduced, dilute acid continues to be introduced for 8 minutes so as to bring the pH of the reaction mixture to a value of 5.2. After this introduction of acid the reaction slurry obtained is kept stirred for 5 minutes.

The total reaction period is 117 minutes.

A slurry or suspension of precipitated silica (called reaction suspension S) is thus obtained, which is next filtered and washed by means of a filter press.

The cake obtained is next fluidized by mechanical and chemical action (simultaneous addition of sulphuric acid and of a quantity of sodium aluminate corresponding to an Al/$SiO_2$ weight ratio of 0.28%). After this disintegration operation, the resulting slurry, with a pH equal to 6.5 and a loss on ignition equal to 79.0% (and therefore a solids content of 21.0% by weight), is sprayed by means of a nozzle sprayer.

The characteristics of the silica A1 obtained in the form of substantially spherical beads are as follows:

| | |
|---|---|
| CTAB specific surface | 155 m$^2$/g |
| BET specific surface | 170 m$^2$/g |
| DOP oil uptake | 270 ml/100 g |
| Aluminum weight content | 0.25% |
| Pore volume V1 represented by the pores of d ≦ 400 Å | 0.99 cm$^3$/g |
| Pore volume V2 represented by the pores 175 Å ≦ d ≦ 275 Å | 0.61 cm$^3$/g |
| V2/V1 ratio | 62% |
| pH | 7.2 |
| Mean particle size | 250 μm |

The silica A1 is subjected to the disintegration test as defined above in the description.

After disintegration with ultrasound it has a median diameter ($\varnothing_{50}$) of 4.0 μm and an ultrasonic disintegration factor ($F_D$) of 8 ml.

EXAMPLE 2 (COMPARATIVE)

1600 liters of a reaction suspension S as prepared in Example 1 are introduced into a stainless steel reactor equipped with a stirring system using propellers and with heating using a jacket.

A solution of aluminum sulphate of relative density at 20° C. equal to 1.2 is next introduced at a rate of 4.8 l/min for 6 minutes. At the end of this addition 18% strength concentrated soda is introduced into the reaction mixture at a rate of 3.8 l/min until the pH of the reaction mixture is equal to 8.0.

The introduction of soda is then stopped and maturing of the reaction mixture is carried out for 20 minutes at a temperature of 94° C.

Sulphuric acid of the type described in Example 1 is then introduced at a rate of 4.0 l/min until the pH of the reaction mixture is equal to 4.5.

The introduction of acid is then stopped and maturing of the reaction mixture is performed for 10 minutes at a temperature of 94° C.

The reaction period (starting from the introduction of aluminum sulphate) is 48 minutes.

A slurry of precipitated silica is thus obtained which is filtered and washed by means of a filter press.

The cake obtained is then fluidized by simple mechanical action. After this disintegration operation the resulting slurry, with a pH equal to 6.6 and loss on ignition equal to 80.0% (and hence a solids content of 20.0% by weight), is sprayed by means of a nozzle sprayer.

The characteristics of the silica A2 obtained in the form of substantially spherical beads are as follows:

| | |
|---|---|
| CTAB specific surface | 151 m$^2$/g |
| BET specific surface | 161 m$^2$/g |
| DOP oil uptake | 254 ml/100 g |
| Aluminum weight content | 1.04% |
| Pore volume V1 represented by the pores of d ≦ 400 Å | 1.01 cm$^3$/g |
| Pore volume V2 represented by the pores 175 Å ≦ d ≦ 275 Å | 0.58 cm$^3$/g |
| V2/V1 ratio | 57% |
| pH | 6.7 |
| Mean particle size | 270 μm |

The silica A2 is subjected to the disintegration test as defined above in the description.

After disintegration with ultrasound it has a median diameter ($Ø_{50}$) of 5.3 μm and an ultrasonic disintegration factor ($F_D$) of 5.3 ml.

EXAMPLE 3

1800 liters of a reaction suspension S as prepared in Example 1 are introduced into a stainless steel reactor equipped with a stirring system using propellers and with heating using a jacket.

A solution of aluminum sulphate of relative density at 20° C. equal to 1.2 is next introduced at a rate of 4.8 l/min for 3 minutes and 20 seconds. At the end of this addition 18% strength concentrated soda is introduced into the reaction mixture at a rate of 3.8 l/min until the pH of the reaction mixture is equal to 7.7.

The introduction of soda is then stopped and maturing of the reaction mixture is undertaken at a temperature of 94° C. for 10 minutes.

Sulphuric acid of the type described in Example 1 is then introduced at a rate of 4.7 l/min until the pH of the reaction mixture is equal to 4.1.

The introduction of acid is then stopped and maturing of the reaction mixture is undertaken at a temperature of 94° C. for 5 minutes.

The reaction period (starting from the introduction of aluminum sulphate) is 34 minutes.

A slurry of precipitated silica is thus obtained which is filtered and washed by means of a filter press.

The cake obtained is next fluidized by mechanical and chemical action (simultaneous addition of sulphuric acid and of a quantity of sodium aluminate corresponding to an Al/SiO$_2$ weight ratio of 0.30%). After this disintegration operation the resulting slurry, with a pH equal to 6.6 and a loss on ignition equal to 78.0% (and hence a solids content of 22.0% by weight), is sprayed by means of a nozzle sprayer.

The characteristics of the silica P1 obtained in the form of substantially spherical beads (in accordance with the invention) are as follows:

| | |
|---|---|
| CTAB specific surface | 161 m$^2$/g |
| BET specific surface | 178 m$^2$/g |
| DOP oil uptake | 266 ml/100 g |
| Aluminum weight content | 0.75% |
| Pore volume V1 represented by the pores of d ≦ 400 Å | 1.08 cm$^3$/g |
| Pore volume V2 represented by the pores 175 Å ≦ d ≦ 275 Å | 0.66 cm$^3$/g |
| V2/V1 ratio | 61% |
| pH | 7.2 |
| Mean particle size | 260 μm |

The silica P1 is subjected to the disintegration test as defined above in the description.

After disintegration with ultrasound it has a median diameter ($Ø_{50}$) of 2.5 μm and an ultrasonic disintegration factor ($F_D$) of 21 ml.

EXAMPLE 4

1670 liters of a reaction suspension S as prepared in Example 1 are introduced into a stainless steel reactor equipped with a stirring system using propellers and with heating using a jacket.

A solution of aluminum sulphate of relative density at 20° C. equal to 1.2 is next introduced at a rate of 4.8 l/min for 5 minutes. At the end of this addition 18% strength concentrated soda is introduced into the reaction mixture at a rate of 3.8 l/min until the pH of the reaction mixture is equal to 7.8.

The introduction of soda is then stopped and maturing of the reaction mixture is undertaken at a temperature of 94° C. for 10 minutes.

Sulphuric acid of the type described in Example 1 is then introduced at a rate of 4.7 l/min until the pH of the reaction mixture is equal to 4.0.

The introduction of acid is then stopped and maturing of the reaction mixture is undertaken at a temperature of 94° C. for 5 minutes.

The reaction period (starting from the introduction of aluminum sulphate) is 40 minutes.

A slurry of precipitated silica is thus obtained which is filtered and washed by means of a filter press.

The cake obtained is next fluidized by mechanical and chemical action (simultaneous addition of sulphuric acid and of a quantity of sodium aluminate corresponding to an Al/SiO$_2$ weight ratio of 0.25%). After this disintegration operation the resulting slurry, with a pH equal to 6.6 and a loss on ignition equal to 79.0% (and hence a solids content of 21.0% by weight), is sprayed by means of a nozzle sprayer.

The characteristics of the silica P2 obtained in the form of substantially spherical beads (in accordance with the invention) are as follows:

| CTAB specific surface | 156 m$^2$/g |
|---|---|
| BET specific surface | 160 m$^2$/g |
| DOP oil uptake | 274 ml/100 g |
| Aluminum weight content | 1.06% |
| Pore volume V1 represented by the pores of d ≦ 400 Å | 1.04 cm$^3$/g |
| Pore volume V2 represented by the pores 175 Å ≦ d ≦ 275 Å | 0.69 cm$^3$/g |
| V2/V1 ratio | 66% |
| pH | 7.0 |
| Mean particle size | 250 μm |

The silica P2 is subjected to the disintegration test as defined above in the description.

After disintegration with ultrasound it has a median diameter ($\varnothing_{50}$) of 2.4 μm and an ultrasonic disintegration factor ($F_D$) of 17 ml.

EXAMPLE 5

The following are introduced into a stainless steel reactor equipped with a stirring system using propellers and with heating using a jacket:

350 liters of water 7.5 kg of Na$_2$SO$_4$ 560 liters of aqueous sodium silicate which has an SiO$_2$/Na$_2$O weight ratio equal to 3.45 and a relative density at 20° C. equal to 1.133.

The silicate concentration, expressed as SiO$_2$, in the initial base stock is then 84 g/l. The mixture is then heated to a temperature of 82° C. while being kept stirred. 390 liters of dilute sulphuric acid of relative density at 20° C. equal to 1.050 are then introduced until a pH value equal to 7.5 (measured at its temperature) is obtained in the reaction mixture. The reaction temperature is 82° C. for the first 25 minutes; it is then raised from 82 to 94° C. over approximately 15 minutes and is then kept at 94° C. until the end of the reaction.

55 liters of aqueous sodium silicate of the type described above and 89 liters of sulphuric acid, also of the type described above, are next introduced jointly into the reaction mixture, this simultaneous introduction of acid and of silicate being carried out so that the pH of the reaction mixture during the introduction period is continuously equal to 7.5±0.1.

The introduction of acid is then stopped and 86 liters of aqueous sodium silicate of the type described above and 33 liters of a solution of aluminum sulphate of relative density at 20° C. equal to 1.2 are introduced jointly into the reaction mixture over 24 minutes.

This joint addition is then stopped and maturing of the reaction mixture is undertaken at 94° C. for 10 minutes.

Sulphuric acid of the type described above is then introduced into the reaction mixture for 7 minutes so as to bring the pH of the reaction mixture to a value equal to 5.0. After this introduction of acid the reaction slurry obtained is kept stirred for 5 minutes.

The total reaction period is 109 minutes.

A slurry of precipitated silica is thus obtained which is filtered and washed by means of a filter press.

The cake obtained is next fluidized by simple mechanical action. After this disintegration operation the resulting slurry, with a pH equal to 6.5 and a loss on ignition equal to 78.3% (and hence a solids content of 21.7% by weight), is sprayed by means of a nozzle sprayer.

The characteristics of the silica P3 obtained in the form of substantially spherical beads (in accordance with the invention) are as follows:

| CTAB specific surface | 149 m$^2$/g |
|---|---|
| BET specific surface | 178 m$^2$/g |
| DOP oil uptake | 260 ml/100 g |
| Aluminum weight content | 0.96% |
| Pore volume V1 represented by the pores of d ≦ 400 Å | 1.01 cm$^3$/g |
| Pore volume V2 represented by the pores 175 Å ≦ d ≦ 275 Å | 0.54 cm$^3$/g |
| V2/V1 ratio | 53% |
| pH | 7.1 |
| Mean particle size | 260 μm |

The silica P3 is subjected to the disintegration test as defined above in the description.

After disintegration with ultrasound it has a median diameter ($\varnothing_{50}$) of 2.7 μm and an ultrasonic disintegration factor ($F_D$) of 17 ml.

EXAMPLE 6

The following are introduced into a stainless steel reactor equipped with a stirring system using propellers and with heating using a jacket:

350 liters of water 7.5 kg of Na$_2$SO$_4$ 580 liters of aqueous sodium silicate which has an SiO$_2$/Na$_2$O weight ratio equal to 3.45 and a density at 20° C. equal to 1.133.

The silicate concentration, expressed as SiO$_2$, in the initial base stock is then 84 g/l. The mixture is then heated to a temperature of 82° C. while being kept stirred. 390 liters of dilute sulphuric acid of relative density at 20° C. equal to 1.050 are then introduced until a pH value equal to 7.5 (measured at its temperature) is obtained in the reaction mixture. The reaction temperature is 82° C. for the first 25 minutes; it is then raised from 82 to 94° C. over approximately 15 minutes and then kept at 94° C. until the end of the reaction.

55 liters of aqueous sodium silicate of the type described above and 89 liters of sulphuric acid, also of the type described above, are then introduced jointly into the reaction mixture, this simultaneous introduction of acid and of silicate being carried out so that the pH of the reaction mixture during the introduction period is continuously equal to 7.5±0.1.

The introduction of acid is then stopped and 50 liters of aqueous sodium silicate of the type described above and 28.5 liters of a solution of aluminum sulphate with a relative density at 20° C. equal to 1.2 are introduced jointly into the reaction mixture for 21 minutes.

This joint addition is then stopped and maturing of the reaction mixture is undertaken at 94° C. for 10 minutes.

Sulphuric acid of the type described above is then introduced into the reaction mixture for 7 minutes so as to bring the pH of the reaction mixture to a value equal to 5.0. After this introduction of acid the reaction slurry obtained is kept stirred for 5 minutes.

The total reaction period is 109 minutes.

A slurry of precipitated silica is thus obtained which is filtered and washed by means of a filter press.

The cake obtained is next fluidized by mechanical and chemical action (simultaneous addition of sulphuric acid and of a quantity of sodium aluminate corresponding to an $Al/SiO_2$ weight ratio of 0.40%). After this disintegration operation the resulting slurry, with a pH equal to 6.5 and a loss on ignition equal to 78.3% (and hence a solids content of 21.7% by weight), is sprayed by means of a nozzle sprayer.

The characteristics of the silica P4 obtained in the form of substantially spherical beads (in accordance with the invention) are as follows:

| | |
|---|---|
| CTAB specific surface | 158 m²/g |
| BET specific surface | 185 m²/g |
| DOP oil uptake | 258 ml/100 g |
| Aluminum weight content | 1.15% |
| Pore volume V1 represented by the pores of d ≦ 400 Å | 1.05 cm³/g |
| Pore volume V2 represented by the pores 175 Å ≦ d ≦ 275 Å | 0.59 cm³/g |
| V2/V1 ratio | 56% |
| pH | 7.1 |
| Mean particle size | 260 µm |

The silica P4 is subjected to the disintegration test as defined above in the description.

After disintegration with ultrasound it has a median diameter ($\emptyset_{50}$) of 2.7 µm and an ultrasonic disintegration factor ($F_D$) of 16 ml.

EXAMPLE 7

The following are introduced into a stainless steel reactor equipped with a stirring system using propellers and with heating using a jacket:

350 liters of water 7.5 kg of $Na_2SO_4$ 580 liters of aqueous sodium silicate which has an $SiO_2/Na_2O$ weight ratio equal to 3.45 and a relative density at 20° C. equal to 1.133.

The silicate concentration, expressed as $SiO_2$, in the initial base stock is then 84 g/l. The mixture is then heated to a temperature of 82° C. while being kept stirred. 390 liters of dilute sulphuric acid of relative density at 20° C. equal to 1.050 are then introduced until a pH value equal to 7.5 (measured at its temperature) is obtained in the reaction mixture. The reaction temperature is 82° C. for the first 25 minutes; it is then raised from 82 to 94° C. over approximately 15 minutes and then kept at 94° C. until the end of the reaction.

55 liters of aqueous sodium silicate of the type described above and 89 liters of sulphuric acid, also of the type described above, are then introduced jointly into the reaction mixture, this simultaneous introduction of acid and of silicate being carried out so that the pH of the reaction mixture during the introduction period is continuously equal to 7.5±0.1.

The introduction of acid is then stopped and 54 liters of aqueous sodium silicate of the type described above and 20.5 liters of a solution of aluminum sulphate with a relative density at 20° C. equal to 1.2 are introduced jointly into the reaction mixture for 15 minutes.

This joint addition is then stopped and maturing of the reaction mixture is undertaken at 94° C. for 10 minutes.

Sulphuric acid of the type described above is then introduced into the reaction mixture for 7 minutes so as to bring the pH of the reaction mixture to a value equal to 5.0. After this introduction of acid the reaction slurry obtained is kept stirred for 5 minutes.

The total reaction period is 104 minutes.

A slurry of precipitated silica is thus obtained which is filtered and washed by means of a filter press.

The cake obtained is next fluidized by mechanical and chemical action (simultaneous addition of sulphuric acid and of a quantity of sodium aluminate corresponding to an $Al/SiO_2$ weight ratio of 0.35%). After this disintegration operation the resulting slurry, with a pH equal to 6.5 and a loss on ignition equal to 78.3% (and hence a solids content of 21.7% by weight), is sprayed by means of a nozzle sprayer.

The characteristics of the silica P5 obtained in the form of substantially spherical beads (in accordance with the invention) are as follows:

| | |
|---|---|
| CTAB specific surface | 166 m²/g |
| BET specific surface | 178 m²/g |
| DOP oil uptake | 260 ml/100 g |
| Aluminum weight content | 0.93% |
| Pore volume V1 represented by the pores of d ≦ 400 Å | 1.02 cm³/g |
| Pore volume V2 represented by the pores 175 Å ≦ d ≦ 275 Å | 0.61 cm³/g |
| V2/V1 ratio | 60% |
| pH | 6.9 |
| Mean particle size | 260 µm |

The silica P5 is subjected to the disintegration test as defined above in the description.

After disintegration with ultrasound it has a median diameter ($\emptyset_{50}$) of 2.7 µm and an ultrasonic disintegration factor ($F_D$) of 15 ml.

The characteristics of the silicas prepared in Examples 1 to 7 and those of a commercial silica in the form of powder sold by Degussa, in this case the powder Ultrasil VN3® (given reference A3), are reported in Table 1 below.

TABLE 1

| | A1 | A2 | A3 | P1 | P2 | P3 | P4 | P5 |
|---|---|---|---|---|---|---|---|---|
| $S_{CTAB}$ (m²/g) | 155 | 151 | 155 | 161 | 156 | 149 | 158 | 166 |
| $S_{BET}$ (m²/g) | 170 | 161 | 170 | 178 | 160 | 178 | 185 | 178 |
| DOP (ml/100 g) | 270 | 254 | 260 | 266 | 274 | 260 | 258 | 260 |
| Al (%) | 0.25 | 1.04 | 0.05 | 0.75 | 1.06 | 0.96 | 1.15 | 0.93 |
| V1 (cm³/g) | 0.99 | 1.01 | 0.93 | 1.08 | 1.04 | 1.01 | 1.05 | 1.02 |
| V2 (cm³/g) | 0.61 | 0.58 | 0.43 | 0.66 | 0.69 | 0.54 | 0.59 | 0.61 |
| V2/V1 (%) | 62 | 57 | 46 | 61 | 66 | 53 | 56 | 60 |
| pH | 7.2 | 6.7 | 6.5 | 7.2 | 7.0 | 7.1 | 7.1 | 6.9 |
| Mean size (µm) | 250 | 270 | 17 | 260 | 250 | 260 | 260 | 260 |
| $\emptyset_{50}$ (µm) | 4.0 | 5.3 | 9.9 | 2.5 | 2.4 | 2.7 | 2.7 | 2.7 |
| $F_D$ (ml) | 8 | 5.3 | 2.3 | 21 | 17 | 17 | 16 | 15 |

EXAMPLE 8

This example illustrates the use and the behaviour of the silicas according to the invention and of silicas not in accordance with the invention in a formulation for industrial rubber.

The following formulation is employed (the parts are expressed by weight):

| | |
|---|---|
| TUFDENE ® 2330 rubber[1] | 50 |
| B.R. 1220 rubber[2] | 25 |
| Natural rubber | 25 |
| Silica | 51 |
| Active ZnO[3] | 1.81 |
| Stearic acid | 0.35 |
| 6DPD[4] | 1.45 |
| CBS[5] | 1.1 |
| DPG[6] | 1.45 |
| Sulphur[7] | 0.9 |
| Silane X50S[8] | 8.13 |

[1] Styrene butadiene copolymer type TUFDENE ® 2330
[2] Butadiene polymer type 1220
[3] Rubber grade zinc oxide
[4] N-(1,3-Dimethylbutyl)-N'-phenyl-p-phenylenediamine
[5] N-Cyclohexyl-2-benzothiazylsulphenamide
[6] Diphenylguanidine
[7] Vulcanizing agent
[8] Silica/rubber coupling agent (product marketed by Degussa)

The formulations are prepared in the following manner:

The following are introduced into an internal mixer (BINBURY® type), in this order and at the times and temperatures of the mixing which are shown in brackets:

Tufdene 2330, B.R. 1220 and natural rubber ($t_0$)(60° C.)

the X50S and ⅔ of the silica ($t_0$+1 min) (80° C.)

the ZnO, the stearic acid, the 6DPD and ⅓ of the silica ($t_0$+2 min) (100° C.)

The discharge from the mixer (mix drop) takes place when the chamber temperature reaches 165° C. (that is to say at approximately $t_0$+5 min 15 8). The mix is introduced onto a roll mill, the rolls being kept at 30° C., to be calendered thereon. The CBS, the DPG and the sulphur are introduced onto this mill.

After homogenization and three fine passes the final mixture is calendered into the form of sheets from 2.5 to 3 mm in thickness.

The results of the tests are as follows:

1—Rheological Properties

The measurements are carried out on the formulations in the raw state.

The results are reported in Table II below. The apparatus employed for conducting the measurements has been shown.

TABLE II

| | A1 | A3 | P1 | P2 | P3 | P4 | P5 |
|---|---|---|---|---|---|---|---|
| Mooney consistency[1] | 163 | 177 | 142 | 133 | 127 | 143 | 138 |
| Min. torque (ln lb)[2] | 37.3 | 42.5 | 34.6 | 32.7 | 30.8 | 34.1 | 33.8 |

[1] MOONEY MV 2000E ® viscometer (Mooney broad (1 + 4) measurement at 100° C.)
[2] MONSANTO 100 S ® rheometer The formulations obtained from the silicas according to the invention result in the lowest values.

This expresses a greater processibility of the mixes prepared from silicas according to the invention, in particular in respect of the extrusion and calendering operations which are often carried out during the manufacture of elastomer compositions (lower energy expenditure for processing the mix, greater ease of injection during the compounding, less die swell during extrusion, less shrinkage on calendering, etc.).

2—Mechanical Properties

The measurements are carried out on vulcanized formulations.

The vulcanization is carried out by heating the formulations to 150° C. for 40 minutes.

The following standards were employed:

(i) tensile tests (moduli, tensile strength, elongation at break):
NFT 46-002 or ISO 37-1977

(ii) tests of abrasion resistance
DIN 53-516

The results obtained are listed in Table III below.

TABLE III

| | A1 | A3 | P1 | P2 | P3 | P4 | P5 |
|---|---|---|---|---|---|---|---|
| 10% modulus/100% modulus | 0.33 | 0.32 | 0.30 | 0.28 | 0.27 | 0.29 | 0.30 |
| Tensile strength (MPa) | 20.6 | 17.7 | 20.8 | 20.6 | 20.2 | 20.6 | 21.1 |
| Break elongation (%) | 470 | 430 | 510 | 510 | 485 | 495 | 495 |
| Abrasion resistance ($mm^3$)[1] | 55 | 58 | 48 | 48 | 52 | 47 | 42 |

[1] the measured value is the loss on abrasion: the lower it is, the better the abrasion resistance.

These last results demonstrate the good reinforcing effect conferred by the silicas according to the invention.

Thus, while resulting in clearly better Theological properties, the silicas according to the invention provide mechanical properties which are at least appreciably equivalent or even better than those obtained with the silicas of the prior art.

On the one hand, the silicas according to the invention produce 10% modulus/100% modulus ratios that are lower than those obtained with the silicas of the prior art, which is a proof of better dispersion of the silica within the rubber matrix.

On the other hand, the high reinforcing power of the silicas according to the invention is confirmed by the high values obtained for the tensile strength and the elongation at break.

Finally, with regard to the abrasion resistance, it can be seen that the loss by abrasion is substantially reduced (5 to 20%) in relation to the comparative silica.

3—Dynamic Properties

The measurements are carried out on vulcanized formulations.

The vulcanization is obtained by heating the formulations to 150° C. for 40 minutes. The results (illustrating the tendency to heat up) are reported in Table IV below (the lower the values, the lower the tendency to heat up). The apparatus employed for conducting the measurements has been shown.

TABLE IV

| | A1 | A3 | P1 | P2 | P3 | P4 | P5 |
|---|---|---|---|---|---|---|---|
| Internal heating (° C.)[1] | 102 | 101 | 95 | 101 | 95 | 98 | 90 |
| Tangent delta 70° C.[2] | 0.139 | 0.130 | 0.128 | 0.138 | 0.127 | 0.130 | 0.124 |

[1] GOODRICH ® flexometer
[2] INSTRON ® visocelasticimeter

The tendency to heat up obtained from silicas according to the invention is fairly low.

What is claimed is:

1. A precipitated silica having:

a CTAB specific surface of between 140 and 200 $m^2/g$, a BET specific surface of between 140 and 200 $m^2/g$, a DOP oil uptake lower than 300 ml/100 g, a median diameter ($\emptyset_{50}$), after disintegration with ultrasound, smaller than 3 µm, an ultrasonic disintegration factor ($F_D$) higher than 10 ml, an aluminum content of between 0.75 and 1.40% by weight, said silica being in a form selected from the group consisting of spherical beads with a mean size of at least 80 µm, a powder with a mean size of at least 15 µm, and granules having a length of at least 1 mm along the axis of their larger dimension.

2. A silica according to claim 1, further having pores, a pore volume and a pore distribution such that the pore volume consisting of the pores whose diameter is between 175 and 275 Å, represents at least 50% of the pore volume consisting of the pores of diameters smaller than or equal to 400 Å.

3. A silica according to claim 1, in the form of spherical beads wherein the mean size of the bead is of at least 100 µm.

4. A silica according to claim 1, wherein the DOP oil uptake is between 200 and 295 ml/100 g.

5. A silica according to claim 1, wherein the median diameter ($\emptyset_{50}$), after disintegration with ultrasound, is smaller than 2.8 µm.

6. A silica according to claim 1, wherein the ultrasonic disintegration factor ($F_D$) is at least 15 ml.

7. A silica according to claim 4, wherein the DOP oil uptake is between 240 and 290 ml/100 g.

8. An elastomer including as a reinforcing filler the precipitated silica as defined in claim 1.

* * * * *